United States Patent [19]

Thaller

[11] 3,996,064
[45] Dec. 7, 1976

[54] ELECTRICALLY RECHARGEABLE REDOX FLOW CELL

[75] Inventor: Lawrence H. Thaller, Strongsville, Ohio

[73] Assignee: The United States of America as represented by the Administrator of the National Aeronautics and Space Administration, Washington, D.C.

[22] Filed: Aug. 22, 1975

[21] Appl. No.: 606,891

[52] U.S. Cl. .................................... 320/2; 429/23; 429/34
[51] Int. Cl.² ................ H01M 10/44; H01M 10/00
[58] Field of Search .............. 136/86 A, 86 R, 164, 136/3, 6·R

[56] References Cited
UNITED STATES PATENTS

| | | | |
|---|---|---|---|
| 3,009,327 | 11/1961 | Weil | 136/86 R UX |
| 3,360,401 | 12/1967 | Grasselli et al. | 136/86 E |

*Primary Examiner*—John H. Mack
*Assistant Examiner*—H. A. Feeley
*Attorney, Agent, or Firm*—N. T. Musial; J. A. Mackin; John R. Manning

[57] ABSTRACT

There is disclosed a bulk energy storage system including an electrically rechargeable reduction-oxidation (REDOX) cell divided into two compartments by a membrane, each compartment containing an electrode. An anode fluid is directed through the first compartment at the same time that a cathode fluid is directed through the second compartment, thereby causing the electrode in the first compartment to have a negative potential while the electrode in the second compartment has a positive potential. The electrodes are inert with respect to the anode and cathode fluids used and the membrane is substantially impermeable to all except select ions of both the anode and cathode fluid, whether the cell is fully charged or in a state of discharge.

Means are provided for circulating the anode and cathode fluids and the electrodes are connected to an intermittent or non-continuous electrical source, which when operating, supplies current to a load as well as to the cell to recharge it. Ancillary circuitry is provided for disconnecting the intermittent source from the cell at prescribed times and for circulating the anode and cathode fluids according to desired parameters and conditions.

11 Claims, 3 Drawing Figures

ELECTRICALLY RECHARGEABLE REDOX FLOW CELL

ORIGIN OF THE INVENTION

This invention was made by an employee of the United States Government and may be manufactured and used by or for the Government of the United States of America for governmental purposes without the payment of any royalties thereon or therefor.

BACKGROUND OF THE INVENTION

Because of the energy crisis of the mid-1970's and due to economic factors within the electric utility industry, there is a need for storing bulk quantities of electrical power which might be produced intermittently or randomly by devices such as wind-driven generators, solar cells or the like. A number of methods have been considered including the storage of compressed air in large reservoirs, flywheels, capacitive storage, inductive storage and a number of electrochemical schemes. Electrochemical storage batteries are generally expensive and deteriorate when subject to discharge and recharge action.

To this date, only pumped water storage wherein water from a water storage pond at one level is directed to a water storage pond at a lower level through a hydroelectric plant having a water pumping capability has proven to be a viable method. Unfortunately, such facilities are limited to areas wherein the terrain is suitable for providing water sources at different elevations.

The electrically rechargeable REDOX flow cell system of the instant invention has a very high overall energy efficiency as compared to other systems and can be discharged more completely than secondary battery systems. Additionally, secondary battery systems are relatively expensive and the plates deteriorate when the batteries are repeatedly discharged and recharged.

OBJECTS AND SUMMARY OF THE INVENTION

It is an object of the invention to provide a bulk energy storage system of very high overall efficiency.

It is another object of the invention to provide an electrical energy storage system having an electrochemical cell member which does not deteriorate by being discharged and recharged.

Still another object of the invention is to provide an electrical bulk energy storage system which does not require high temperatures for operation.

It is yet another object of the invention to provide a bulk energy storage system including a REDOX cell and an intermittent source of electrical power which can supply electrical energy to a load into the cell and for pumping means circulate anode and cathode fluids through the cell whereby recharging takes place.

A further object of the invention is to provide a bulk energy storage system wherein anode and cathode fluids may be circulated through the REDOX cell under automatic control at predetermined times and conditions.

In summary, the invention provides a bulk energy electrical storage system wherein anode and cathode fluids are circulated through a REDOX cell to provide electrical power to a load and to cause recharging of the cell when voltage is supplied thereto from an intermittent or noncontinuous electrical power source while the fluids are circulating.

BRIEF DESCRIPTION OF THE DRAWINGS

Referring now to FIG. 1, there is shown an electrical system including an electric or voltage-producing cell 10 divided by an ion selective membrane 11 into a first compartment 12 and a second compartment 13. An inert electrode 14 is disposed in the first compartment 12 and produces a negative potential at a terminal 15. In a like manner, an inert electrode 16 is disposed in the second compartment 13 and produces a positive voltage at a terminal 17.

Figure 1:
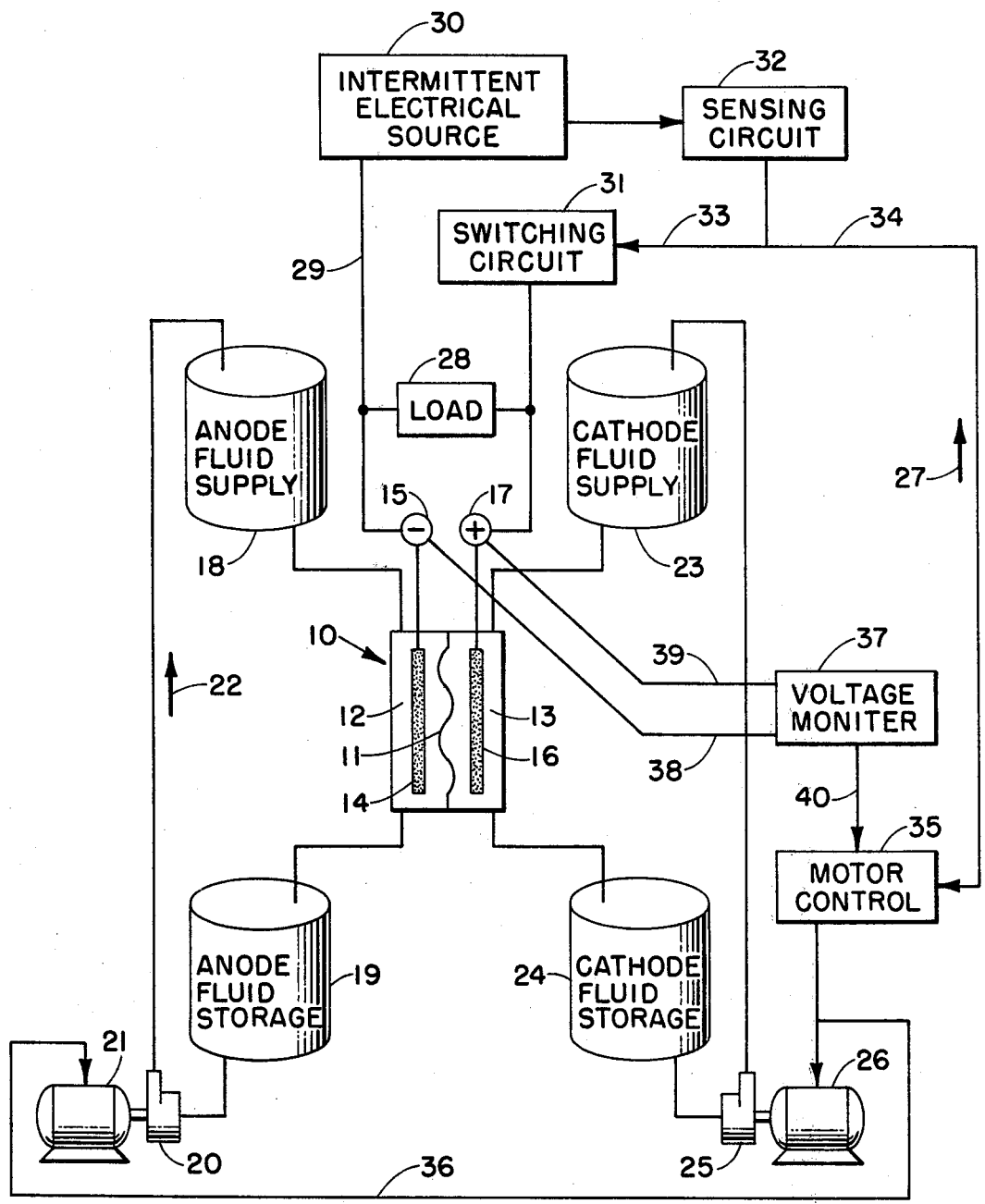
FIG. 1 is a schematic drawing of an electrical system embodying the invention.

The difference of electric potential or voltage between the terminals 15 and 17 results from flowing an anode fluid containing a REDOX couple primarily in its reduced state through compartment 12. Similarly, a cathode fluid containing a REDOX couple primarily in its oxidized state flows through compartment 11. The electrochemical action and ion exchange process which take place in cell 10 to produce the voltage between terminals 15 and 17 will be explained after FIGS. 1, 2 and 3 have been described.

The anode fluid for compartment 12 flows from an anode fluid supply tank 18 through compartment 12 and into an anode fluid storage tank 19. After all of the anode fluid has passed from supply tank 18 into the anode storage tank 19, a pump 20 driven by an electric motor 21 pumps the anode fluid from storage tank 19 back to the anode fluid supply tank. Motor 21 is energized from the terminals 15 and 17 of cell 10.

Just as the anode fluid, cathode fluid flows from a cathode fluid supply tank 23 through the compartment 13 and into a cathode fluid storage tank 24 a pump 25 driven by an electric motor 26 pumps the cathode fluid back to supply tank 23 as indicated by arrow 27. Like motor 21, motor 26 is energized from terminals 15 and 17 of cell 10.

The purpose of the electrical system shown in FIG. 1 is to supply electrical power as needed to a load 28. This load is connected between the terminals 15 and 17 of cell 10. One side of load 28 is connected through a lead 29 to an intermittent or non-continuous electrical source 30 as, for example, a wind-driven generator. The other side of load 28 is connected through a switching circuit to the source 30.

To the end that the intermittent electrical source 30 may be disconnected from load 28, and consequently from the terminals 15 and 17, when there is little or no electrical power being generated by source 30, there is provided a sensing circuit 32 having an input connected to source 30 and an output connected via a lead 33 to the input of switching circuit 31 and via a lead 34 to a first input of a motor control 35. An output of the motor control 35 is connected via leads 36 to motors 21 and 26. When the output voltage of source 30 drops below a predetermined value, sensing circuit 32 causes switching circuit 31 to open, thereby disconnecting load 28 and the terminals 15 and 17 from source 30.

To prevent cell 10 from becoming completely discharged, there is provided a voltage monitor having an input connected by leads 38 and 39 to terminals 15 and 17, respectively, and an output connected via a lead 40 to a second input of motor control 35. Thus, when the cell voltage, as manifested at terminals 15 and 17, drops below a predetermined value, voltage monitor 37 signals motor control 35 to inactivate motors 21 and 26.

Sensing circuit 32 signals motor control 35 via lead 34 when source 30 has sufficient electrical voltage to charge cell 10. This signal overrides the signal from voltage monitor 37 so that the pumps 21 and 26 will circulate the anode and cathode fluids when charging voltage is available.

Figure 2:
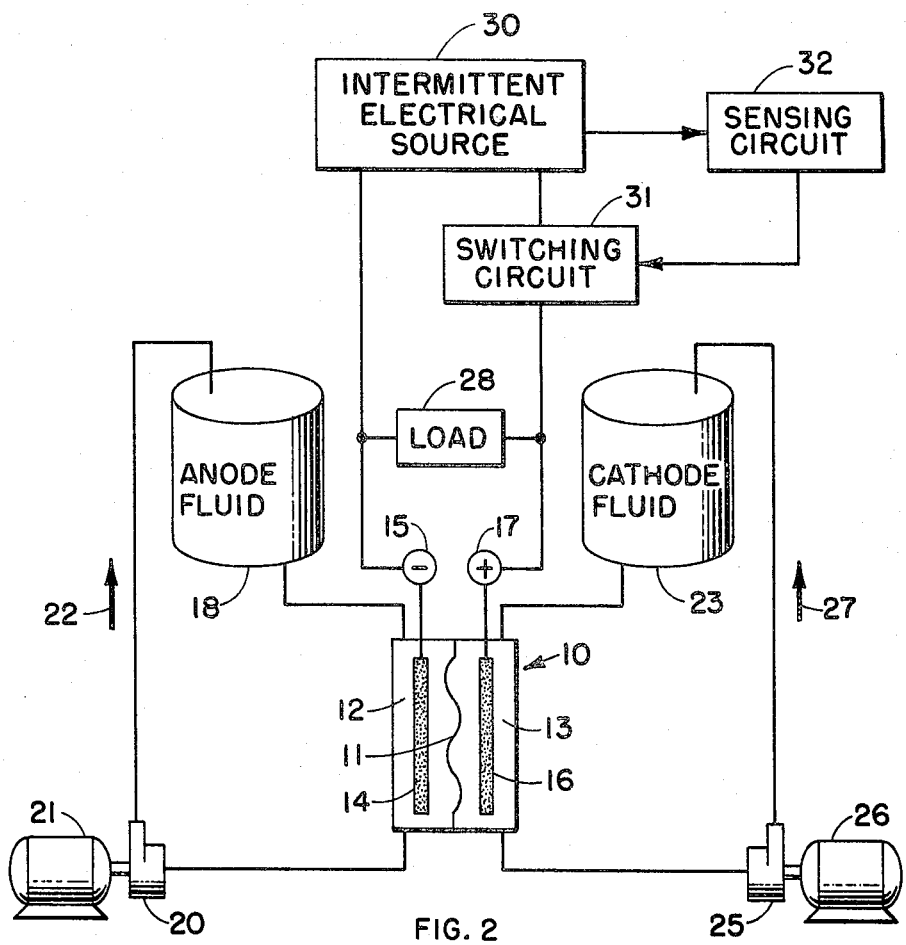
FIG. 2 is similar to FIG. 1 but some of the components have been eliminated.

The electrical system shown in FIG. 2 is similar to that shown in FIG. 1 and corresponding parts are identified by corresponding numerals. In the system shown in FIG. 2, the storage tanks 19 and 24 have been eliminated, together with the voltage monitor and the motor control. With this arrangement, motors 21 and 26 run continuously. However, the sensing circuit 32, if desired, may function as in FIG. 1 to disconnect the intermittent electrical source 30 from load 28 and terminals 15 and 17 when its voltage drops below a predetermined magnitude.

Figure 3:
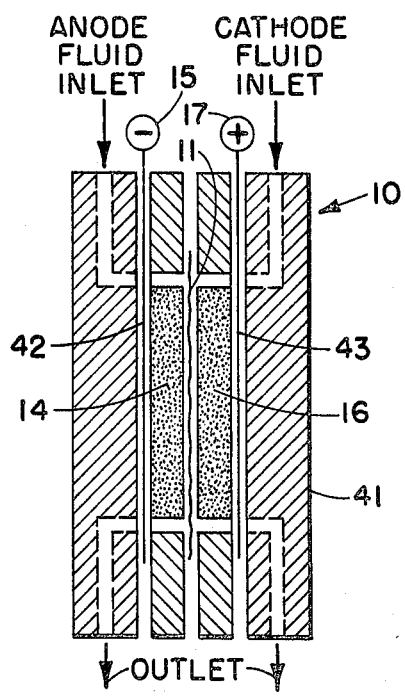
FIG. 3 is a schematic showing more details of the electric cell of FIGS. 1 and 2.

While FIGS. 2 and 3 show the fluid supply tanks 18 and 23 positioned higher than cell 10, this is not necessarily true as to the actual physical location. There is some advantage to locating the supply tanks 18, 23 and the storage tanks 19, 24 above and below cell 10, respectively. With such an arrangement, fluid will flow by gravity through cell 10 even though pumps 21 and 26 are inoperative. However, FIG. 2 does not rely on gravity as the pumps continuously circulate the anode and cathode fluids.

Referring now to FIG. 3, the voltage cell 10 is shown in greater detail than in FIGS. 1 and 2. Parts corresponding to those of cell 10 in FIGS. 1 and 2 are identified by like numerals. As shown, cell 10 comprises a container 41 which may be of plastic, hard rubber or the like divided into first and second compartments by an ion selective membrane 11. Electrodes 14 and 16 disposed in the first and second compartments, respectively, may be graphite felt pads which are inert to the anode and cathode fluids. Voltage and current are provided for terminals 15 and 17 by graphite foils 42 and 43 which contact the electrodes 14 and 16, respectively.

The inert electrodes may also be graphite foils, cloths or felts, or platinized metal screens of the type used in fuel cells. In general, the electrodes must be inert to electrochemical or chemical reaction with the anode cathode fluids while promoting the REDOX reaction on their surfaces. They must also be porous electronic conductors.

The system of FIG. 2 is preferred slightly to that of FIG. 1 because it is simpler and more efficient. If both systems were to cycle between 5 and 95 percent depth of discharge, the open circuit voltage would vary between 1.334 and 1.032, assuming the cells 10 are identical and the couples are $Fe^{+3}/Fe^{+2}$ and $Cr^{+2}/Cr^{+3}$. With the arrangement of FIG. 2 and continuously flowing fluids, the cell voltage under load would gradually decrease from the upper to the lower limit (neglecting IR and polarization losses).

With the system of FIG. 1 the voltage would be nearly constant and closer to the lower limit as the fluids flow from the supply tanks 18 and 23 to the storage tanks 19 and 24, respectively.

Factors which must be considered regarding the electrodes 14 and 16, membrane 11 and the anode and cathode fluids which contain reduced and oxidized species dissolved in a solvent will now be discussed. The preferred solvent is water.

A. Electrode Considerations

The selection of electrode materials for an electrically rechargeable redox flow cell involves several simple criteria:

1. Both the oxidized and reduces species must be soluble.
2. The oxidation and reduction potentials of the different species must be such that the solvent will remain inert during charging as well as on stand.
3. Oxygen containing or demanding ions (e.g., $MnO_4$, $Cr^{+3}$) should be avoided to simplify hydrogen ion management problems.
4. Complexed ions (e.g., $Fe(CN)_6^{-4}$) should be avoided to minimize overall system weight.

The first criterion simply encompasses the classical type of redox electrode such as the ferrous/ferric couple in a chloride solution.

$$Fe^{+2} \rightarrow Fe^{+3} + e^- \qquad 1.$$

Here both the chlorides are highly soluble and the inert electrode does not become fouled or complicated by the presence of insoluble species. Charge neutrality is maintained by the diffusion into or out of the half cell compartment of some other type of ion (i.e., $H^+$ or $Cl^-$).

The second criterion deals with the requirement of maintaining the solvent as a neutral species during charge, stand, and discharge. If water is the solvent, ions above hydrogen in the list of oxidation/reduction potentials should be avoided ($Cr^{+2}$, $V^{+2}$, $Ti^{+2}$), since hydrogen could be displaced. On the other end of the scale, ions such as $Co^{+3}$, $Ce^{+4}$, and $Mn^{+4}$ could possibly displace oxygen from soluton. Care must also be exercised during the charging process where the overpotentials applied could lead to the simultaneous discharge of solvent fragments along with the desired ions.

Criterion three comes into consideration when the overall charge balance and ion management schemes are arranged. Consider the permanganate ion reduction.

$$MnO_4^- + 8H^+ + 5e^- \rightarrow 4H_2O + Mn^{+2} \qquad 2.$$

Eight hydrogen ions are requied for this half cell reaction. In a complete system, large amounts of acid would be required and pH changes would be large. This may be contrasted with the ferrous/ferric half cell reaction (1) which requires no hydrogen ions. The fourth criterion is an extension of the third. The ferri/ferro cyanide couple will serve as an illustration.

$$Fe(CN)_6^{-4} \rightarrow Fe(CN)_6^{-3} + e^- \qquad 3.$$
$$Fe^{+2} \rightarrow Fe^{+3} + e^- \qquad 1.$$

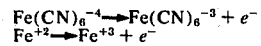

Although the above pair of half cell reactions meet the first three criteria, the equivalent weight of the cyanide complex is 272 as opposed to 56 for the noncomplexed iron. Thus, from an energy density standpoint the use of complexed ions is not desirable.

B. Membrane Considerations

The requirements and options in regard to the membrane that is used to separate the anode and cathode fluids can be illustrated by considering a simple redox cell system with the reactions written in the discharge direction.

Anode compartment; $A^{+1} \rightarrow A^{+2} + e^-$
Cathode compartment; $C^{+2} + e^- \rightarrow C^{+1}$ The membrane must provide an impermeable barrier to both the A and C ions in both states of charge. Further, it must provide the means by which charge neutralization is maintained. During discharge either positive ions (H$^+$, for example) must move from the anode compartment through the membrane to the cathode compartment or negative ions (Cl$^-$, for example) must move from the cathode compartment to the anode compartment. There is an inherent disadvantage from an energy standpoint in moving positive ions from the anode compartment during discharge as opposed to the other option. The iron/chromium system will be used to illustrate this. An ideal hydrogen ion transport membrane and an ideal chloride ion transport membrane will be used in the illustration.

Case 1. - H$^+$ membrane

| Before discharge | | After discharge | |
|---|---|---|---|
| Cr$^{+2}$ - 1.0 N | Fe$^{+3}$ - 1.0 N | Cr$^{+3}$ - 1.0 N | Fe$^{+2}$ - 1.0 N |
| H$^+$ - 1.0 N | Cl$^-$ - 3.0 N | Cl$^-$ - 3.0 N | H$^+$ - 1.0 N |
| Cl$^-$ - 3.0 N | | | Cl$^-$ - 3.0 N |

Case 2. - Cl$^-$ membrane

| Before discharge | | After discharge | |
|---|---|---|---|
| Cr$^{+2}$ - 1.0 N | Fe$^{+3}$ - 1.0 N | Cr$^{+3}$ - 1.0 N | Fe$^{+2}$ - 1.0 N |
| Cl$^-$ - 2.0 N | Cl$^-$ - 1.0 N | Cl$^-$ - 3.0 N | Cl$^-$ - 3.0 N |

In Case 1 as compared to Case 2, 1 mole of HCl is required per Faraday over and above any acid that may be required for pH adjustment needed for solution stabilization. In addition, an anion membrane would most likely have a better selectivity for preventing cross diffusion of the redox ions. Cross diffusion of such ions would represent a permanent loss of system capacity.

Redox couples which preclude the electrolysis of water during discharge of the cell must be used. The anode and cathode fluids are respective solutions between 1 and 4 molar.

The anode fluid preferably contains water as a solvent having dissolved therein a chloride salt selected from the group consisting of titanium chloride, chromium chloride, tin chloride, vanadium chloride, manganese chloride and cerium chloride whereby cations in a reduced state are produced. The cathode fluid preferably contains water as a solvent having dissolved therein a chloride salt selected from the group consisting of iron chloride, chromium chloride, vanadium chloride, manganese chloride, and cerium chloride whereby cations in an oxidized state are produced.

It will be understood that changes and modifications may be made to the above-described invention without departing from the spirit and scope thereof as set forth in the claims appended hereto.

What is claimed is:

1. An electrical energy storage system for supplying electrical power to a load, comprising:
    an electrochemical cell divided into two compartments by an ion selective membrane;
    first and second electrodes disposed in respective first and second ones of said two compartments;
    means for connecting said load to said electrodes;
    means for flowing an anode fluid through said first compartment;
    means for flowing a cathode fluid through said second compartment;
    means for applying a charging voltage to said electrodes while said anode and cathode fluids are flowing to recharge said fluids, said electrodes being inert to the respective anode and cathode fluids, said membrane being substantially impermeable to all but chloride ions,
    said means for applying a charging voltage being a source of noncontinuous electrical power;
    switching means interposed between said source of non-continuous electrical power and said load; and
    sensing means for opening said switching means to disconnect said source from said load when the voltage of said source is below a predetermined magnitude.

2. The system of claim 1 wherein said electrodes are porous graphite bodies.

3. The system of claim 1 wherein said anode fluid comprises a solvent and a solute, said solvent being water having dissolved therein said solute which is a chloride salt selected from the group consisting of titanium chloride, chromium chloride, tin chloride, vanadium chloride and manganese chloride whereby cations in a reduced state are produced.

4. The system of claim 3 wherein said anode fluid is a solution between 1 and 4 molar.

5. The system of claim 1 wherein said cathode fluid comprises a solvent and a solute, said solvent being water having dissolved therein said solute which is a chloride salt selected from the group consisting of iron chloride, chromium chloride, vanadium chloride, manganese chloride, and cerium chloride whereby cations in an oxidized state are produced.

6. The system of claim 5 wherein said cathode fluid is a solution between 1 and 4 molar.

7. The system of claim 1 wherein said means for flowing anode fluid comprises:
    an anode fluid supply tank;
    anode fluid pumping means for returning said anode fluid to said anode fluid supply tank from said first compartment; and wherein said means for flowing cathode fluid comprises a cathode fluid supply tank and cathode fluid pumping means for returning said cathode fluid to said cathode fluid supply tank from said second compartment.

8. The system of claim 7 and including:
    an anode fluid storage tank connected between said first compartment of said cell and said anode pumping means; and
    a cathode fluid storage tank connected between said second compartment of said cell and said cathode pumping means.

9. The system of claim 1 and including means responsive to said cell voltage for inactivating said anode and cathode pumping means when said cell voltage drops below a predetermined valve and means for reactivating said anode and cathode pumping means when said source of non-continuous electrical power is supplying power.

10. The system of claim 9 wherein said anode and cathode fluid supply tanks are positioned at a higher level than said cell and wherein said anode and cathode fluid storage tanks are at a lower level than said cell whereby the anode and cathode fluids flow through said first and second compartments by gravity.

11. The system of claim 1 wherein said electrodes are platinized porous metal bodies.

* * * * *